(12) United States Patent
Fujii et al.

(10) Patent No.: US 7,945,228 B2
(45) Date of Patent: May 17, 2011

(54) RECEIVER AND ELECTRONIC APPARATUS USING THE SAME

(75) Inventors: Takeshi Fujii, Osaka (JP); Hiroaki Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 291 days.

(21) Appl. No.: 11/917,541

(22) PCT Filed: Apr. 18, 2007

(86) PCT No.: PCT/JP2007/058429
§ 371 (c)(1),
(2), (4) Date: Dec. 14, 2007

(87) PCT Pub. No.: WO2007/125793
PCT Pub. Date: Nov. 8, 2007

(65) Prior Publication Data
US 2009/0081976 A1   Mar. 26, 2009

(30) Foreign Application Priority Data
Apr. 27, 2006  (JP) .................................. 2006-123209

(51) Int. Cl.
*H04B 1/06* (2006.01)
(52) U.S. Cl. ..................... 455/255; 455/260; 455/313
(58) Field of Classification Search ........... 455/255–265
See application file for complete search history.

(56) References Cited

U.S. PATENT DOCUMENTS

| | | | |
|---|---|---|---|
| 5,345,602 A * | 9/1994 | Wiedemann et al. ......... | 455/137 |
| 5,630,214 A * | 5/1997 | Yamamoto et al. ......... | 455/190.1 |
| 6,072,996 A * | 6/2000 | Smith ......................... | 455/189.1 |
| 7,079,597 B1 * | 7/2006 | Shiraishi et al. ............. | 455/255 |
| 7,184,733 B2 * | 2/2007 | Asayama et al. ............. | 455/260 |
| 7,274,919 B2 * | 9/2007 | Hirtzlin et al. ............. | 455/188.1 |
| 7,548,742 B2 * | 6/2009 | Johnson ........................ | 455/313 |
| 2005/0119025 A1 * | 6/2005 | Mohindra et al. ......... | 455/552.1 |
| 2006/0089103 A1 * | 4/2006 | Osburn ........................ | 455/265 |
| 2006/0160507 A1 * | 7/2006 | Forrester ...................... | 455/147 |
| 2009/0002213 A1 * | 1/2009 | LaMarche et al. ........... | 341/155 |

FOREIGN PATENT DOCUMENTS

| | | |
|---|---|---|
| JP | 04-142120 A | 5/1992 |
| JP | 10-093469 A | 4/1998 |
| JP | 2001-516985 A | 10/2001 |
| JP | 2005-130279 A | 5/2005 |
| WO | WO 99/13595 | 3/1999 |

OTHER PUBLICATIONS

International Search Report for Application No. PCT/JP2007/058429 dated Jul. 24, 2007.

* cited by examiner

*Primary Examiner* — Lana Le
(74) *Attorney, Agent, or Firm* — RatnerPrestia

(57) ABSTRACT

A receiver has a first semiconductor chip and second semiconductor chip for receiving signals of a first radio frequency band, and a communication unit for performing communication using signals of a second radio frequency band. A second mixing unit in the second semiconductor chip uses second local signals supplied from a second local signal oscillator when the frequency of first local signals fed from a first-local-signal-output terminal to a first-local-signal-input terminal is within a predetermined range from the second frequency band, or uses first local signals supplied from the first-local-signal-input terminal when the frequency of the first local signals fed from the first-local-signal-output terminal to the first-local-signal-input terminal is out of the predetermined range from the second frequency band.

7 Claims, 4 Drawing Sheets

RECEIVER AND ELECTRONIC APPARATUS USING THE SAME

THIS APPLICATION IS A U.S. NATIONAL PHASE APPLICATION OF PCT INTERNATIONAL APPLICATION PCT/JP2007/058429.

TECHNICAL FIELD

The present invention relates to a receiver for receiving signals and an electronic apparatus using this.

BACKGROUND ART

A conventional receiver will be hereinafter described with reference to FIG. 4. In FIG. 4, conventional receiver 201 has first semiconductor chip 202 and second semiconductor chip 203 for diversity-receiving signals of a first radio frequency band, and a communication unit (not shown) for performing communication using signals of a second radio frequency band. First semiconductor chip 202 has the following elements:
- first local oscillator 204 for oscillating first local signals;
- first divider 205 for N-dividing the first local signals supplied from first local oscillator 204; and
- first mixing unit 206 for frequency-converting the signals of the first radio frequency band using the first local signals supplied from first divider 205.

Here, N is an integer of N>1. First semiconductor chip 202 has the following elements:
- first filter 207 connected to the output side of first mixing unit 206; and
- first-local-signal-output terminal 208 for outputting the first local signals supplied from first local oscillator 204 to the outside of first semiconductor chip 202.

Second semiconductor chip 203 has the following elements:
- first-local-signal-input terminal 209 for inputting the first local signals supplied from first-local-signal-output terminal 208 into second semiconductor chip 203; and
- second divider 210 for N-dividing the first local signals supplied from first-local-signal-input terminal 209.

Second semiconductor chip 203 has the following elements:
- second mixing unit 211 for frequency-converting the signals of the first radio frequency band using the first local signals supplied from second divider 210; and
- second filter 212 connected to the output side of second mixing unit 211.

In conventional receiver 201, second mixing unit 211 of second semiconductor chip 203 performs frequency conversion using first local oscillator 204 of first semiconductor chip 202. Therefore, the power consumption of receiver 201 can be reduced.

An example of the conventional art document information related to the invention of this application is Patent document 1.

In this structure, the first radio frequency band can be separated from the frequency band of the first local signals, by setting dividing ratio N between first divider 205 and second divider 210 to be higher than 1. Thus, the possibility that the frequency of the first local signals comes into the first radio frequency band to cause obstruction can be reduced. The constant of inductance or capacitance of first local oscillator 204 can be decreased with increase in oscillating frequency of first local oscillator 204, namely increase in N. Therefore, first local oscillator 204 can be downsized.

When N is increased, however, the power consumption of first divider 205 or the like is increased. Signals of the second radio frequency band supplied from the communication unit come into first-local-signal-output terminal 208 and first-local-signal-input terminal 209, namely external terminals of respective semiconductor chips 202 and 203. Second mixing unit 211 originally frequency-converts the signals of the first radio frequency, but also frequency-converts the signals of the second radio frequency band coming from the communication unit. At this time, when the frequency of the signals of the second radio frequency band coming from the communication unit is close to a predetermined range from the frequency of the first local signals fed from first-local-signal-output terminal 208 into first-local-signal-input terminal 209, the frequency conversion by second mixing unit 211 causes the generation of disturbing signals that cannot be completely removed by second filter 212. This disturbing signal arises from signals of the second radio frequency band coming from the communication unit. As a result, the receiving quality of receiver 201 degrades, disadvantageously.

[Patent document 1] Japanese Patent Unexamined Publication No. 2005-130279

SUMMARY OF THE INVENTION

A receiver of the present invention has a first semiconductor chip and second semiconductor chip for receiving signals of a first radio frequency band, and a communication unit for performing communication using signals of a second radio frequency band. The first semiconductor chip has the following elements:
- a first local oscillator for oscillating first local signals;
- a first mixing unit for frequency-converting the signals of the first radio frequency band using the first local signals supplied from the first local oscillator; and
- a first-local-signal-output terminal for outputting the first local signals supplied from the first local oscillator to the outside of the first semiconductor chip.

The second semiconductor chip has the following elements:
- a second local oscillator for oscillating second local signals;
- a first-local-signal-input terminal for inputting the first local signals supplied from the first-local-signal-output terminal into the second semiconductor chip; and
- a second mixing unit for frequency-converting the signals of the first radio frequency band using ones of the second local signals supplied from the second local oscillator and the first local signals supplied from the first-local-signal-input terminal.

When the frequency of the first local signals fed from the first-local-signal-output terminal to the first-local-signal-input terminal is within a predetermined range from the second frequency band, the second mixing unit frequency-converts the signals of the first radio frequency band using the second local signals supplied from the second local oscillator. When the frequency of the first local signals fed from the first-local-signal-output terminal to the first-local-signal-input terminal is out of the predetermined range from the second frequency band, the second mixing unit frequency-converts the signals of the first radio frequency band using the first local signals supplied from the first-local-signal-input terminal.

In this structure, when the frequency of the first local signals fed from the first-local-signal-output terminal to the first-local-signal-input terminal is within the predetermined range from the second frequency band, the second mixing unit uses the second local signals passing the inside of second semiconductor chip 3. Therefore, mixing of the signals of the second frequency band from the communication unit into the second mixing unit can be suppressed. Thus, the receiving quality of receiver 1 can be improved.

REFERENCE MARKS IN THE DRAWINGS

Figure 1:
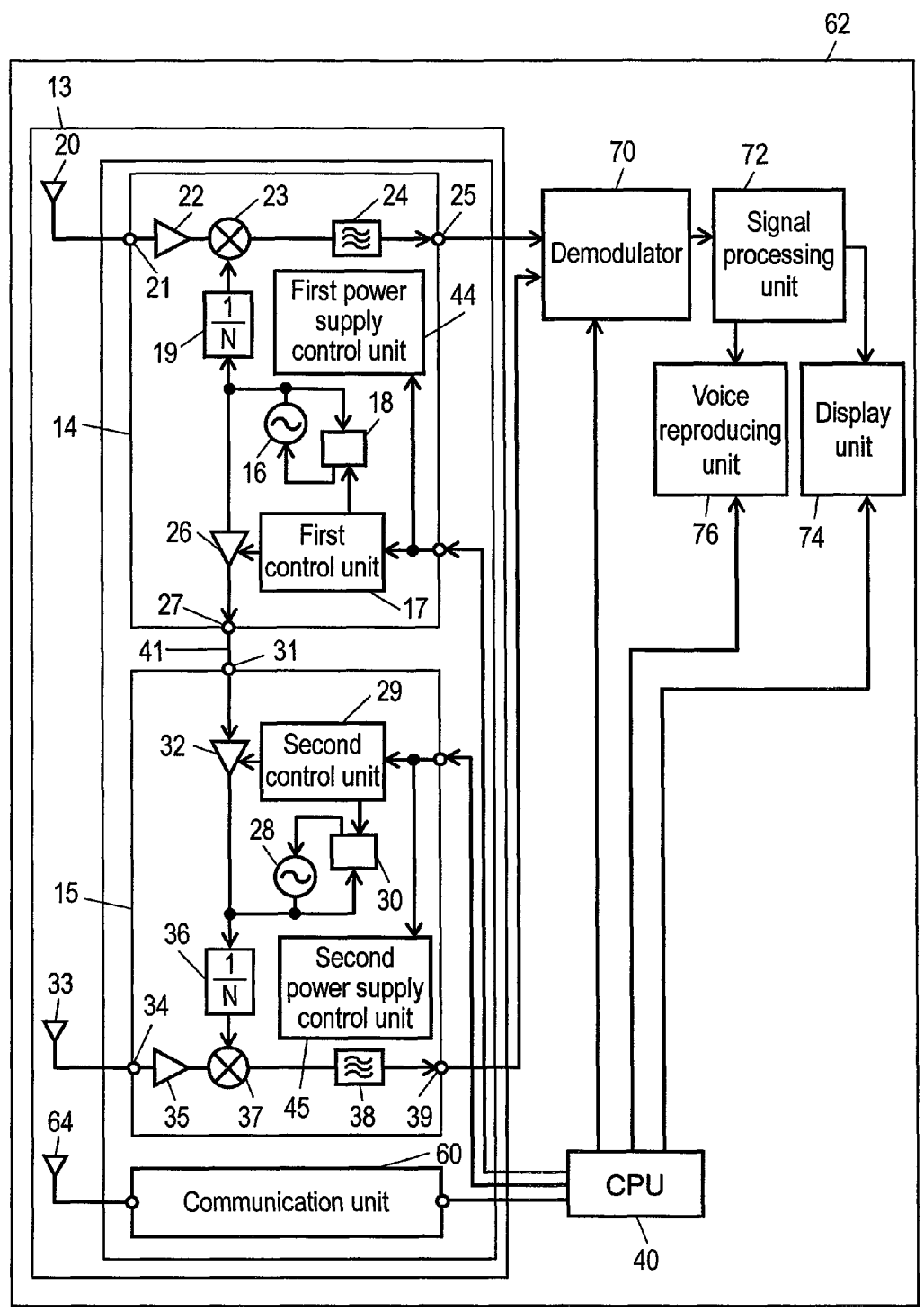
FIG. 1 is a block diagram of a receiver in accordance with a first exemplary embodiment of the present invention.

13 receiver
14 first semiconductor chip
15 second semiconductor chip
16 first local oscillator
17 first control unit
18 first phase locked loop (PLL) circuit
19 first divider
20 first antenna
21 first input terminal
22 first high-frequency amplifier
23 first mixing unit
24 first filter
25 first output terminal
26 first buffer
27 first-local-signal-output terminal
28 second local oscillator
29 second control unit
30 second PLL circuit
31 first-local-signal-input terminal
32 second buffer
33 second antenna
34 second input terminal
35 second high-frequency amplifier
36 second divider
37 second mixing unit
38 second filter
39 second output terminal
40 central processing unit (CPU)
41 transmission line
42 third buffer
43 fourth buffer
44 first power supply control unit
45 second power supply control unit
60 communication unit
62 electronic apparatus
70 demodulator
72 signal processing unit
74 display unit
80 channel of VHF band
82 channel of UHF band
84 frequency band of first local signal in receiving channel of VHF band
86 frequency band of first local signal in receiving channel of UHF band
88 frequency band of first local signal after 8 division
90 frequency band of first local signal after 2 division
92 frequency band of 810 MHz-960 MHz (third-generation wideband code division multiple access (W-CDMA))
94 frequency band of 1.42 GHz-1.51 GHz (third-generation W-CDMA)
96 frequency band of 1.71 GHz-1.88 GHz (third-generation W-CDMA)
98 frequency band of 1.92 GHz-2.17 GHz (third-generation W-CDMA)
100 frequency band of 1.56 GHz-1.59 GHz (global positioning system (GPS))
102 frequency band of 2.4 GHz-2.5 GHz (wireless local area network (LAN)) 104, 106, 108, 110 overlap radio frequency band

DETAILED DESCRIPTION OF PREFERRED EMBODIMENTS

Exemplary embodiments of the present invention will be described hereinafter with reference to the accompanying drawings.

First Exemplary Embodiment

The first exemplary embodiment of the present invention is described with reference to FIG. 1. FIG. 1 is a block diagram of a receiver in accordance with the first exemplary embodiment of the present invention.

In FIG. 1, receiver 13 has first semiconductor chip 14 and second semiconductor chip 15 for diversity-receiving signals of a first radio frequency band, and communication unit 60 for performing communication using signals of a second radio frequency band. Electronic apparatus 62 employing receiver 13 has demodulator 70 coupled to the output side of first semiconductor chip 14 and second semiconductor chip 15, and signal processing unit 72 coupled to the output side of demodulator 70. Electronic apparatus 62 also has display unit 74 such as a liquid crystal display and voice reproducing unit 76 such as a speaker that are coupled to the output side of signal processing unit 72. Electronic apparatus 62 also has CPU 40 for controlling the circuit of each block inside it.

First semiconductor chip 14 has the following elements:
  first local oscillator 16 for oscillating first local signals;
  first phase-locked loop (PLL) circuit 18 that is loop-coupled to first local oscillator 16 and controls the frequency of the first local signals using signals from first control unit 17; and
  first divider 19 for dividing the signals from first local oscillator 16. First semiconductor chip 14 also has first input terminal 21 into which received signals from first antenna 20 are input. First semiconductor chip 14 also has the following elements:
  first input filter (not shown) for removing noise of the signals supplied from first input terminal 21; and
  first high-frequency amplifier 22 for amplifying signals from the first input filter.
First semiconductor chip 14 also has first mixing unit 23 for frequency-converting signals supplied from first high-frequency amplifier 22 using the first local signals supplied from first divider 19. First semiconductor chip 14 also has the following elements:
  first filter 24 for removing noise from signals supplied from first mixing unit 23; and
  first output terminal 25 for outputting signals supplied from first filter 24 to the outside of first semiconductor chip 14.
First semiconductor chip 14 also has first buffer 26 for outputting the first local signals supplied from first local oscillator 16 to the outside of first semiconductor chip 14 through first-local-signal-output terminal 27.

Second semiconductor chip 15 has the following elements:
second local oscillator 28 for oscillating second local signals; and
second PLL circuit 30 that is loop-coupled to second local oscillator 28 and controls the frequency of the second local signals using signals from second control unit 29.

Second semiconductor chip 15 has second buffer 32 for inputting the first local signals supplied from first-local-signal-output terminal 27 into second semiconductor chip 15 through first-local-signal-input terminal 31. Second semiconductor chip 15 also has second input terminal 34 into which received signals from second antenna 33 are input. Second semiconductor chip 15 also has the following elements:
second input filter (not shown) for removing noise from signals supplied from second input terminal 34; and
second high-frequency amplifier 35 for amplifying signals supplied from the second input filter.

Second semiconductor chip 15 also has second divider 36 for dividing ones of the second local signals from second local oscillator 28 and the first local signals from second buffer 32. Second semiconductor chip 15 also has second mixing unit 37 for frequency-converting signals from second high-frequency amplifier 35 using ones of the first local signals and second local signals from divider 36.

Second semiconductor chip 15 also has the following elements:
second filter 38 that is coupled to the output side of second mixing unit 37 and removes noise from signals supplied from second mixing unit 37; and
second output terminal 39 for outputting signals supplied from second filter 38 to the outside of second semiconductor chip 15.

First semiconductor chip 14 has first power supply control unit 44 for selecting whether to turn on or off the individual operation of each of circuit units such as first local oscillator 16, first PLL circuit 18, first buffer 26, first high-frequency amplifier 22, first mixing unit 23, first divider 19, and first filter 24. Second semiconductor chip 15 has second power supply control unit 45 for selecting whether to turn on or off the individual operation of each of circuit units such as second local oscillator 28, second PLL circuit 30, second buffer 32, second high-frequency amplifier 35, second mixing unit 37, second divider 36, and second filter 38.

First power supply control unit 44 and second power supply control unit 45 receive information indicating the circuit state (described later) from CPU 40 disposed outside receiver 13, and select whether to turn on or off operation of each circuit unit. First control unit 17 and second control unit 29 are controlled by CPU 40 disposed outside receiver 13. First-local-signal-output terminal 27 is coupled to first-local-signal-input terminal 31 through transmission line 41.

Figure 2:
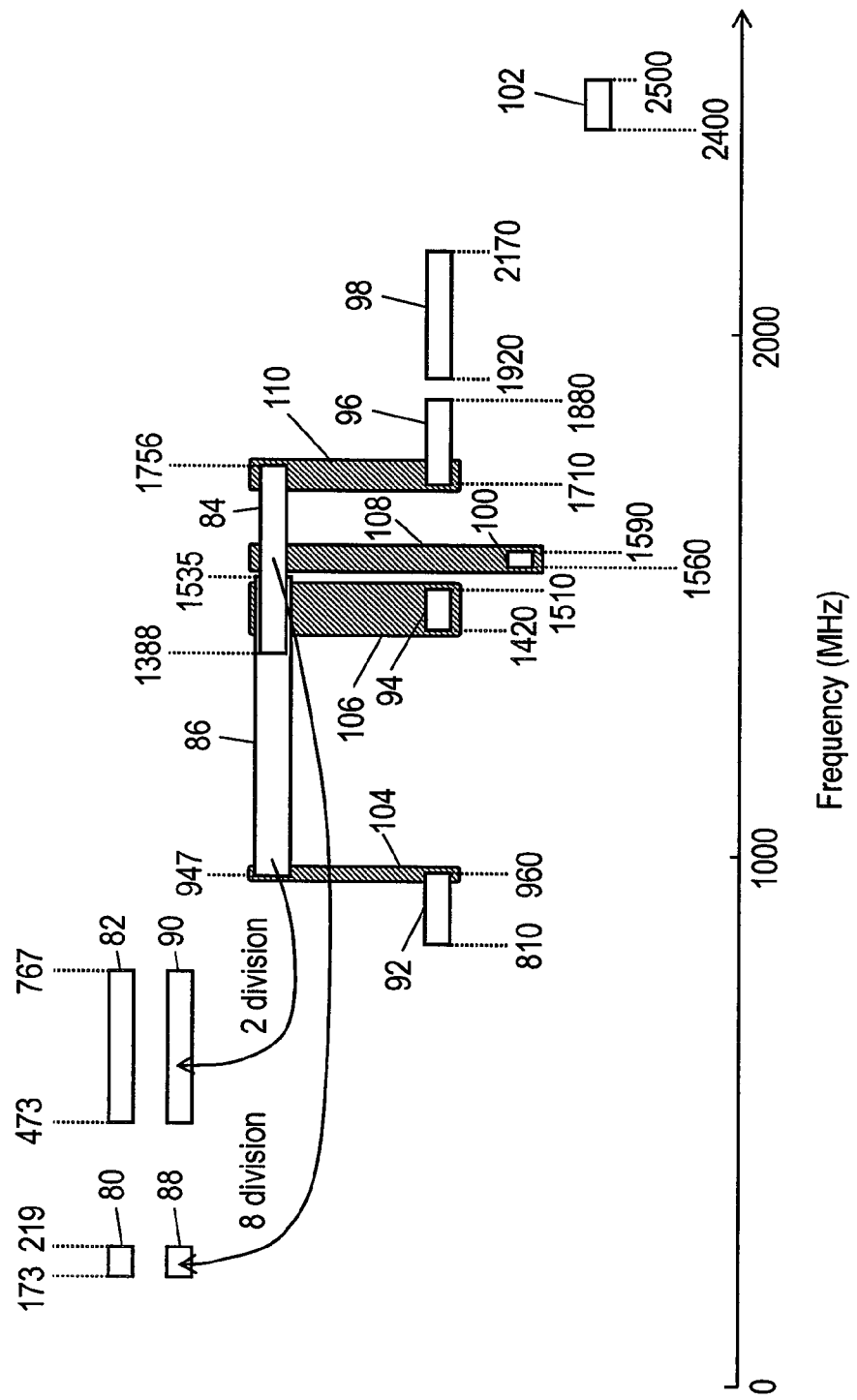
FIG. 2 shows a relationship among the frequency band of first local signals when a channel of a very high frequency (VHF) band is received, the frequency band of first local signals when a channel of an ultrahigh frequency (UHF) band is received, a first radio frequency band, and a second radio frequency band, in the receivers in accordance with the first exemplary embodiment and a second exemplary embodiment of the present invention.

Operation of receiver 13 is described with reference to FIG. 2, assuming a specific receiving state. FIG. 2 shows a relationship among frequency band 84 of the first local signals when channel 80 of a VHF band is received, frequency band 86 of the first local signals when channel 82 of an UHF band is received, a first radio frequency band, and a second radio frequency band, in the receiver in accordance with the first exemplary embodiment of the present invention. FIG. 2 also shows frequency band 88 of the first local signals obtained by 8-dividing the frequency of frequency band 84 of the first local signals when channel 80 of the VHF band is received, and frequency band 90 of the first local signals obtained by 2-dividing the frequency of frequency band 86 of the first local signals when channel 82 of an UHF band is received.

In first exemplary embodiment, the first radio frequency band is a receiving frequency band of television (TV) broadcasting diversity-received by receiver 13. As shown in FIG. 2, for example, the first radio frequency band is 173 MHz-219 MHz of channel 80 of the VHF band, which is used in terrestrial digital broadcasting in Japan, and 473 MHz-767 MHz of channel 82 of the UHF band. Frequency band 88 obtained by 8-dividing first local signals 84 includes the frequency obtained by frequency-converting the frequency of channel 80 of the VHF band, which is the first radio frequency band, into intermediate frequency 500 KHz using first mixing unit 23 and second mixing unit 37. Similarly, frequency band 90 obtained by 2-dividing the first local signals includes the frequency obtained by frequency-converting the frequency of channel 82 of the UHF band, which is the first radio frequency band, into intermediate frequency 500 KHz using first mixing unit 23 and second mixing unit 37. In other words, when the frequency conversion is upper local, frequency band 88 obtained by 8-dividing first local signals 84 in receiving channel 80 of the VHF band is 173.5 MHz-219.5 MHz. Frequency band 90 obtained by 2-dividing first local signals 86 in receiving channel 82 of the UHF band is 473.5 MHz-767.5 MHz. When the dividing ratio between first divider 19 and second divider 36 in receiving channel 80 of the VHF band is assumed to be 8 division, frequency band 88 of the first local signals before division is 1388 MHz-1756 MHz. When the dividing ratio between first divider 19 and second divider 36 in receiving channel 82 of the UHF band is assumed to be 2 division, frequency band 90 of the first local signals before division is 947 MHz-1535 MHz.

The second radio frequency band of FIG. 2 is a frequency band of signals transmitted and received by communication unit 60 of receiver 13. In first exemplary embodiment, the second radio frequency band is transmitting/receiving frequency bands 92, 94, 96 and 98 of a portable phone, receiving frequency band 100 of a global positioning system (GPS) as an additional radio function of the portable phone, and transmitting/receiving frequency band 102 of a wireless local area network (LAN). Transmitting/receiving frequency bands 92, 94, 96 and 98 of the portable phone are frequency band 92 of 810 MHz-960 MHz, which is the transmitting/receiving frequency band of corresponding to the third-generation wideband code division multiple access (W-CDMA) standard to be used generally in the portable phone in Japan, frequency band 94 of 1.42 GHz-1.51 GHz, frequency band 96 of 1.71 GHz-1.88 GHz, and frequency band 98 of 1.92 GHz-2.17 GHz. The receiving radio frequency band of the GPS is frequency band 100 of 1.56 GHz-1.59 GHz, and the transmitting/receiving radio frequency band of the wireless LAN is frequency band 102 of 2.4 GHz-2.5 GHz.

These frequency bands are arranged in this manner, so that the frequency band of the first local signals before division of receiver 13 and the second radio frequency band partially overlap each other. Overlap radio frequency bands 104, 106, 108 and 110 including the overlap frequencies and the frequencies in a predetermined range near them are shown by oblique line parts in FIG. 2. Therefore, when receiving operation of TV broadcasting and transmitting/receiving operation of a portable phone or additional radio function are simultaneously performed using receiver 13, signals of overlap radio frequency bands 104, 106, 108 and 110 can cause obstruction when signals of the first radio frequency band are received. The frequencies in the predetermined range near the overlap frequencies are separated from the overlap frequencies by about 1 MHz to 10 MHz. The frequencies in the predetermined range depend on the attenuation characteristic or modulation method outside the passing frequency bands of first filter 24 and second filter 38.

As a result, when frequency bands 84 and 86 of the first local signals are not close to second radio frequency bands 92, 94, 96 and 100 by within the predetermined range, operation of second semiconductor chip 15 or a circuit connected to this is not disturbed even if signals of the second radio frequency bands 92, 94, 96 and 100 are fed into first-local-signal-input terminal 31. In this case, second semiconductor chip 15 inputs, into first-local-signal-input terminal 31, first local signals 84 or first local signals 86 supplied from first-local-signal-output terminal 27 of first semiconductor chip 14. Second mixing unit 37 converts the frequency of the signals of first radio frequency band 80 or first radio frequency band 82 supplied from second high-frequency amplifier 35 into an intermediate frequency, using first local signals 88 or first local signals 90 after division through second buffer 32 and second divider 36. At this time, in second semiconductor chip 15, the power consumption can be reduced by turning off the operation of second local oscillator 28 and second PLL circuit 30.

While, when frequency bands 84 and 86 of the first local signals are close to second radio frequency bands 92, 94, 96 and 100 by within the predetermined range, feeding the signals of second radio frequency bands 92, 94, 96 and 100 into first-local-signal-input terminal 31 can disturb the operation of second semiconductor chip 15 or a circuit connected to this. In this case, second semiconductor chip 15, using second mixing unit 37, converts the frequency of the received signals of the first radio frequency band from second high-frequency amplifier 35 into an intermediate frequency with reference to the second local signals supplied from second local oscillator 28 through second divider 36. When the operation of second buffer 32 is turned off in second semiconductor chip 15, the receiving quality of receiver 13 can be kept sufficient without inputting the signals of second radio frequency bands 92, 94, 96 and 100 supplied from communication unit 60 into second mixing unit 37. Simultaneously, when the operation of first buffer 26 is turned off in first semiconductor chip 14, unnecessary radiation to communication unit 60 can be suppressed and the transmitting/receiving quality of communication unit 60 can be kept sufficient without outputting first signals 84 and 86 from first-local-signal-output terminal 27 of first semiconductor chip 14 to the outside.

In first exemplary embodiment, the first radio frequency band is assumed to be a frequency band for terrestrial digital broadcasting used in Japan, and the second radio frequency band is assumed to be a frequency band for third generation W-CDMA standard to be used in Japan. However, the first radio frequency band may be a frequency band for TV broadcasting in Europe or USA, and the second radio frequency band may be a global system for mobile communication (GSM). Also when the second radio frequency band for wireless LAN is not frequency band 102 of 2.4 GHz-2.5 GHz but the frequency band near 5 GHz or the other frequency band, a similar advantage can be obtained.

The frequency of second local signals oscillated by second local oscillator 28 may be set different from the frequency of first local signals oscillated by first local oscillator 16. For example, when the frequency of first local signals is close to the second radio frequency band by within a predetermined range, first semiconductor chip 14 frequency-converts the received signals of the first radio frequency band into intermediate frequency 500 KHz using first mixing unit 23 with reference to the first local signals of upper local supplied from first local oscillator 16. However, second semiconductor chip 15 may frequency-convert the received signals of the first radio frequency band into intermediate frequency 500 KHz using second mixing unit 37 with reference to the second local signals of lower local supplied from second local oscillator 28. In other words, the frequencies of the first and second local signals used by first semiconductor chip 14 and second semiconductor chip 15 for diversity reception are set substantially not the same but different, namely upper local and lower local, respectively. The frequency difference between the first local signals and second local signals is set substantially twice the intermediate frequency. Thus, the disturbing signals generated by the mixing of the first local signals into second mixing unit 37 and the mixing of the second local signals into first mixing unit 23 can be removed by first filter 24 and second filter 38, and the receiving quality of receiver 13 can be improved.

In the present embodiment, dividing ratio N between first divider 19 and second divider 36 is assumed to be 8 division when channel 80 of the VHF band is received, and 2 division when channel 82 of the UHF band is received. Another dividing ratio N can also provide a similar advantage.

In the case where the intermediate frequency is low as in the first embodiment, when the dividing ratio N between first divider 19 and second divider 36 is set at 1, the first radio frequency band and the frequency of the first local signals are in substantially the same frequency band. Therefore, the second radio frequency band is not close to the frequency of the first local signals by within the predetermined range. In the case where the intermediate frequency is high differently from the first embodiment, however, even when the dividing ratio N between first divider 19 and second divider 36 is set at 1, the second radio frequency band can be close to the frequency of first local signals by within the predetermined range.

Second Exemplary Embodiment

Figure 3:
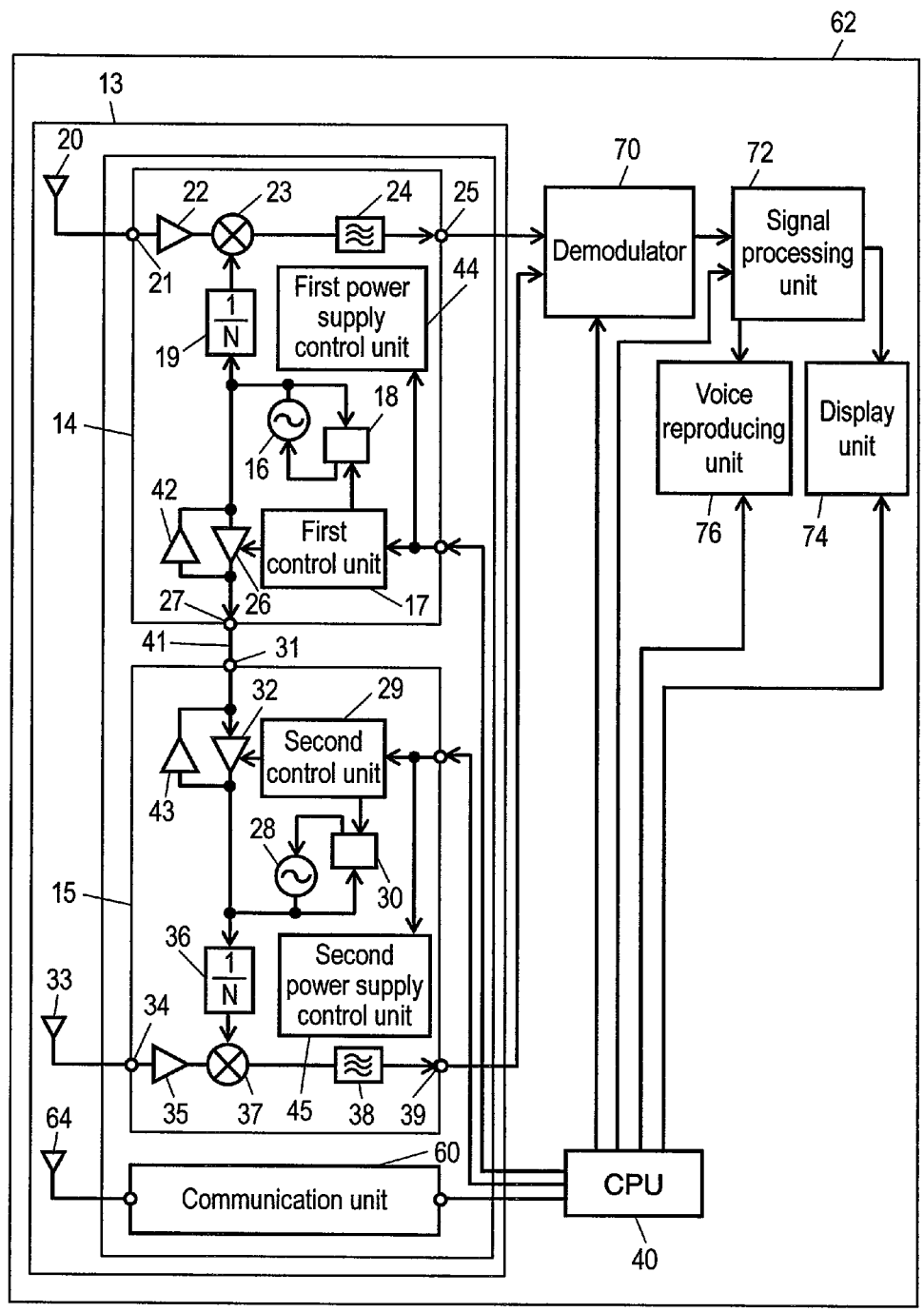
FIG. 3 is a block diagram of a receiver in accordance with a second exemplary embodiment of the present invention.
Figure 4:
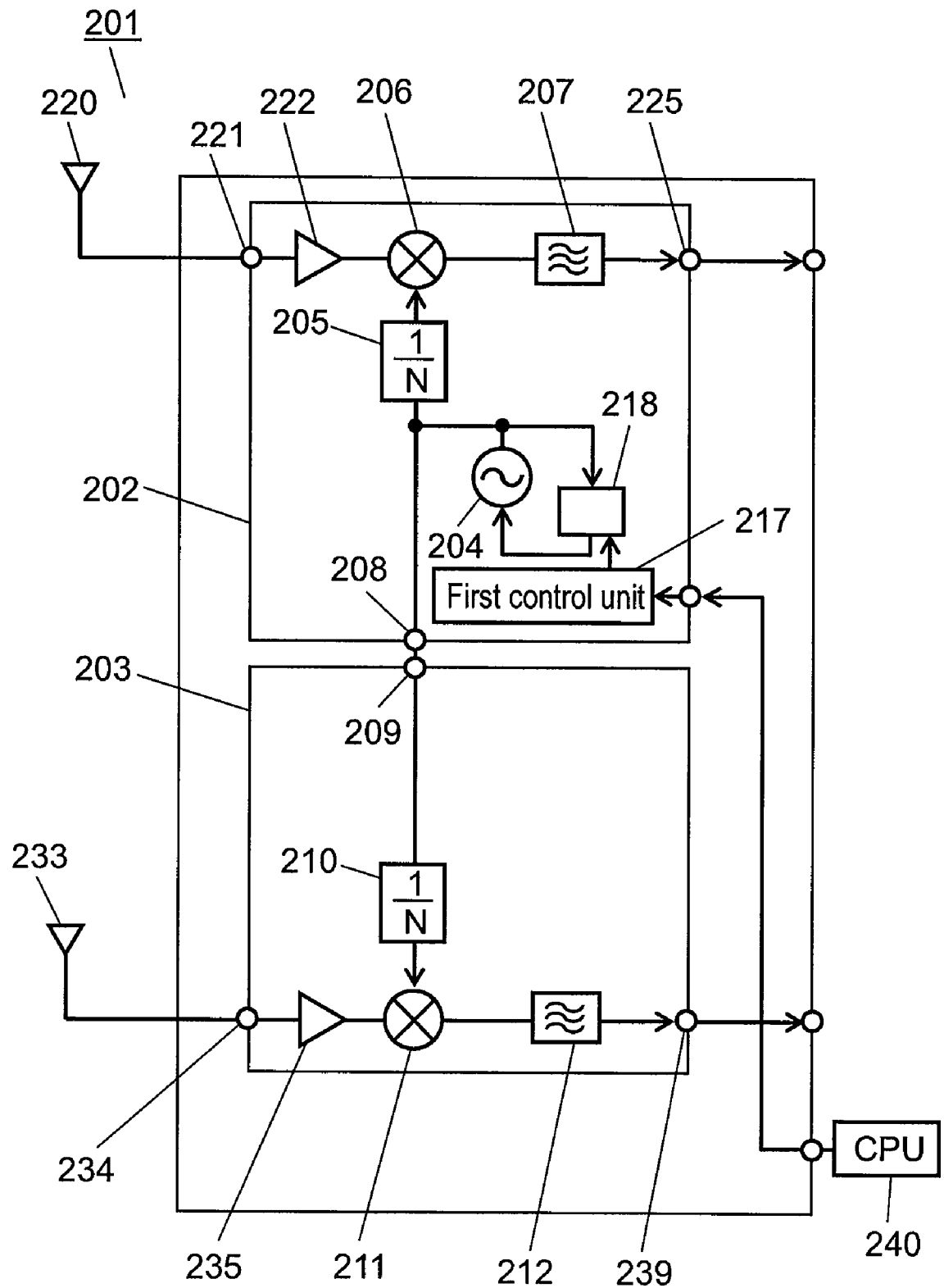
FIG. 4 is a block diagram of a conventional receiver.

The second exemplary embodiment of the present invention is described with reference to FIG. 3. FIG. 3 is a block diagram of a receiver in accordance with the second exemplary embodiment of the present invention. Elements similar to those in the first exemplary embodiment are denoted with the same reference marks, and the descriptions of those elements are omitted and the difference is described. In FIG. 3, the second exemplary embodiment is different from the first exemplary embodiment in that third buffer 42 whose input/output direction is opposite to that of first buffer 26 is coupled to first buffer 26 in parallel and fourth buffer 43 whose input/output direction is opposite to that of second buffer 32 is coupled to second buffer 32 in parallel.

First semiconductor chip 14 has first power supply control unit 44 for selecting whether to turn on or off the individual operation of each of circuit units such as first local oscillator 16, first PLL circuit 18, first buffer 26, third buffer 42, first high-frequency amplifier 22, first mixing unit 23, first divider 19, and first filter 24. Second semiconductor chip 15 has second power supply control unit 45 for selecting whether to turn on or off the individual operation of each of circuit units such as second local oscillator 28, second PLL circuit 30, second buffer 32, fourth buffer 43, second high-frequency amplifier 35, second mixing unit 37, second divider 36, and second filter 38.

First power supply control unit 44 and second power supply control unit 45 receive information indicating the circuit state (described later) from CPU 40 disposed outside receiver 13, and select whether to turn on or off operation of each circuit unit. CPU 40 switches between the diversity receiving state and the non-diversity receiving state based on the receiving situation determined by demodulator 70. For example, when the bit error rate (BER) as a demodulating result is lower than a predetermined value and the receiving situation is sufficient, receiver 13 is put into the non-diversity receiving state. When the BER is the predetermined value or higher and the receiving situation is not sufficient, receiver 13 is put into the diversity receiving state. Here, the BER is an average of the demodulating result at a certain time.

Next, operation of receiver 13 of second exemplary embodiment of the present invention is described. The relationship of the frequency of the signals of the first radio frequency band or the like to be received is assumed to be similar to the first embodiment of FIG. 2. First semiconductor chip 14 and second semiconductor chip 15 of receiver 13 of FIG. 3 can perform the operation similar to that of the first embodiment in diversity-receiving the signals of the first radio frequency band. Second semiconductor chip 15 outputs second local signals supplied from second oscillator 28 to the outside of second semiconductor chip 15 through fourth buffer 43 and first-local-signal-input terminal 31. In first semiconductor chip 14, first divider 19 divides ones of the first local signals fed from first local oscillator 16 and the second local signals fed from first-local-signal-input terminal 31 through transmission line 41, first-local-signal-output terminal 27, and third buffer 42. First mixing unit 23 frequency-converts the signals from first high-frequency amplifier 22 using ones of the first local signals and second local signals supplied from first divider 19.

In such a structure, during diversity receiving, first semiconductor chip 14 and second semiconductor chip 15 select one from following three circuit states.

1) Diversity circuit state A: First semiconductor chip 14 and second semiconductor chip 15 perform frequency conversion using the first local signals from first local oscillator 16. Unnecessary second local oscillator 28 and second PLL circuit 30 are turned off.

2) Diversity circuit state B: First semiconductor chip 14 and second semiconductor chip 15 perform frequency conversion using the second local signals from second local oscillator 28. Unnecessary first local oscillator 16 and first PLL circuit 18 are turned off.

3) Diversity circuit state C: First semiconductor chip 14 performs frequency conversion using the first local signals from first local oscillator 16, and second semiconductor chip 15 performs frequency conversion using the second local signals from second local oscillator 28. Unnecessary first buffer 26, second buffer 32, third buffer 42, and fourth buffer 43 are turned off.

In diversity circuit state C, two local oscillators 16 and 28 and two PLL circuits 18 and 30 requiring relatively large current are operated, so that the current consumption is high. Therefore, the frequencies of first local signals and second local signals are not close to the second radio frequency band by within the predetermined range, receiver 13 preferably performs diversity reception in diversity circuit state A or diversity circuit state B.

During non-diversity receiving by receiver 13, first semiconductor chip 14 and second semiconductor chip 15 select one from following four circuit states.

1) Non-diversity circuit state D: First semiconductor chip 14 performs frequency conversion using the first local signals from first local oscillator 16. Unnecessary each circuit unit in second semiconductor chip 15 is turned off.

2) Non-diversity circuit state E: Second semiconductor chip 15 performs frequency conversion using the second local signals from second local oscillator 28. Unnecessary each circuit unit in first semiconductor chip 14 is turned off.

3) Non-diversity circuit state F: First semiconductor chip 14 performs frequency conversion using the second local signals from second local oscillator 28. Unnecessary first local oscillator 16 and first PLL circuit 18 of first semiconductor chip 14, and unnecessary each circuit unit of second semiconductor chip 15 that is not related to the second local signals are turned off.

4) Non-diversity circuit state G: Second semiconductor chip 15 performs frequency conversion using the first local signals from first local oscillator 16. Unnecessary each circuit unit of first semiconductor chip 14 that is not related to the first local signals, and unnecessary second local oscillator 28 and second PLL circuit 30 of second semiconductor chip 15 are turned off.

In non-diversity circuit state D, the frequency conversion is performed using first local oscillator 16 in first semiconductor chip 14 for receiving signals from antenna 20. Also in non-diversity circuit state E, the frequency conversion is performed using second local oscillator 28 of second semiconductor chip 15 for receiving signals from antenna 33. Therefore, when the frequency of first local signals and the frequency of second local signals are close to the second radio frequency band by within the predetermined range, the receiving quality in non-diversity circuit states D and E can be set better than that in non-diversity circuit states F and G. Since first buffer 26, second buffer 32, third buffer 42, and fourth buffer 43 are turned off in non-diversity circuit states D and E, the current consumption can be reduced comparing with non-diversity circuit states F and G. Therefore, it is preferable that receiver 13 performs the non-diversity reception in non-diversity circuit states D and E.

Switch between the diversity-receiving state and the non-diversity-receiving state in receiver 13 is described especially using diversity circuit states A and B and non-diversity circuit states D and E capable of reducing current consumption.

First, when the receiving state of first semiconductor chip 14 and second semiconductor chip 15 of receiver 13 is non-diversity circuit state D and the receiving situation determined by demodulator 70 is not sufficient, CPU 40 controls first power supply control unit 44 and second power supply control unit 45 in response to the determination result of demodulator 70. First power supply control unit 44 and second power supply control unit 45 change the operation of each circuit unit in first semiconductor chip 14 and second semiconductor chip 15 into operation in diversity circuit state A. Circuit units whose operation is changed and state is changed from OFF to ON are first buffer 26 of first semiconductor chip 14, and second buffer 32, second divider 36, second high-frequency amplifier 35, second mixing unit 37, and second filter 38 of second semiconductor chip 15. These circuit units involve no local oscillator and no PLL circuit, and the states of them can be switched to the diversity circuit state without waiting a lock-up time requiring a predetermined time. In other words, when receiver 13 lies in non-diversity circuit state D, switching the state of receiver 13 to diversity circuit state A can shorten the amount of time between the determination that the receiving situation is not sufficient and the improvement of the receiving performance of receiver 13.

Similarly, when the receiving state of first semiconductor chip 14 and second semiconductor chip 15 of receiver 13 is non-diversity circuit state E and the receiving situation determined by the demodulator is not sufficient, CPU 40 controls first power supply control unit 44 and second power supply control unit 45 in response to the determination result of the demodulator. First power supply control unit 44 and second power supply control unit 45 change the operation of circuit units of first semiconductor chip 14 and second semiconductor chip 15 into operation in diversity circuit state B. Circuit units whose operation is changed and state is changed from OFF to ON are third buffer 42, first divider 19, first high-frequency amplifier 22, first mixing unit 23, and first filter 24 of first semiconductor chip 14, and fourth buffer 43 of second semiconductor chip 15. These circuit units involve no local oscillator and no PLL circuit, and the states of them can be switched to the diversity circuit state without waiting the lock-up time requiring the predetermined time. In other words, when receiver 13 is non-diversity circuit state E, switching the state of receiver 13 to diversity circuit state B can shorten the amount of time between the determination that the receiving situation is not sufficient and the improvement of the receiving performance of receiver 13.

Thus, receiver 13 of the second exemplary embodiment, in diversity-receiving the first radio frequency band, can perform frequency conversion using only the first local signals of first semiconductor chip 14, and also can perform frequency conversion using only the second local signals of second semiconductor chip 15. Therefore, switching from the non-diversity circuit state to the diversity circuit state does not require the predetermined time of the lock-up time, and can improve the receiving performance of receiver 13. In other words, when the non-diversity circuit state is switched to the diversity circuit state after the receiving situation becomes insufficient, the switching time to the improvement of the receiving performance of receiver 13 can be reduced.

When receiver 13 performs non-diversity reception, the receiving quality of first antenna 20 and first semiconductor chip 14 as one receiving system can differ from that of second antenna 33 and second semiconductor chip 15 as the other receiving system. In this case, it is preferable that receiver 13 can select a receiving system having higher receiving quality from receiving systems lying in non-diversity circuit states D and E. In other words, in the structure of receiver 13 of the second exemplary embodiment, the receiving quality can be improved by selecting one state having higher receiving quality from non-diversity circuit states D and E, and switching from any of non-diversity circuit states D and E to a diversity circuit state can be performed in a short time. For example, when the correlation between the directivity of first antenna 20 and that of second antenna 33 is low in response to the mounting position and material difference of an electronic apparatus such as a portable telephone, a non-diversity circuit state having high receiving quality is selected appropriately. When the receiving situation of the first radio frequency band is deteriorated by mobile reception, receiver 13 is switched from the non-diversity circuit state to the diversity circuit state in a short time, thereby keeping the receiving quality high.

Receiver 13 is assumed to be formed of two semiconductor chips, namely first semiconductor chip 14 and second semiconductor chip 15. However, receiver 13 may be formed of one chip.

INDUSTRIAL APPLICABILITY

A receiver of the present invention can improve the receiving quality, and can be used for an electronic apparatus such as a portable telephone or an on-vehicle TV broadcasting receiver.

The invention claimed is:

1. A receiver comprising:
a first semiconductor chip and a second semiconductor chip for receiving a signal in a first radio frequency band; and
a communication unit for performing communication using a signal in a second radio frequency band,
the first semiconductor chip including:
a first local oscillator for oscillating a first local signal;
a first mixing unit for frequency-converting the signal of the first radio frequency band using the first local signal supplied from the first local oscillator; and
a first-local-signal-output terminal for outputting the first local signal supplied from the first local oscillator to the second semiconductor chip,
the second semiconductor chip including:
a second local oscillator for oscillating a second local signal;
a first-local-signal-input terminal for inputting the first local signal supplied from the first-local-signal-output terminal into the second semiconductor chip; and
a second mixing unit for frequency-converting the signal of the first radio frequency band using one of the second local signal supplied from the second local oscillator and the first local signal supplied from the first-local-signal-input terminal,
wherein, when frequency of the first local signal is determined to be in a predetermined frequency range of the second frequency band, the first semiconductor chip does not output the first local signal to the second semiconductor chip, and the second mixing unit frequency-converts the signal of the first radio frequency band using the second local signal,
wherein, when frequency of the first local signal is determined to be out of the predetermined frequency range of the second frequency band, the first semiconductor chip outputs the first local signal to the second semiconductor chip, and the second mixing unit frequency-converts the signal of the first radio frequency band using the first local signal.

2. The receiver of claim 1, wherein
the first semiconductor chip further includes a first divider for dividing the first local signal supplied from the first local oscillator, the first divider being coupled between the first local oscillator and the first mixing unit, and
the second semiconductor chip further includes a second divider for dividing the first local signal supplied from the first-local-signal-input terminal, the second divider being coupled between the first-local-signal-input terminal and the second mixing unit.

3. The receiver of claim 1, wherein
the second semiconductor chip further includes a second filter coupled to an output side of the second mixing unit.

4. The receiver of claim 1, wherein
the first semiconductor chip and the second semiconductor chip diversity-receive a signal of the first radio frequency band.

5. The receiver of claim 1, wherein
the first semiconductor chip further includes a first buffer for outputting the first local signal supplied from the first local oscillator to the first-local-signal-output terminal, and
the second semiconductor chip further includes a second buffer for inputting the first local signal supplied from the first-local-signal-input terminal into the second mixing unit.

6. A receiver comprising:
a first semiconductor chip and a second semiconductor chip for receiving a signal of a first radio frequency band; and
a communication unit for performing communication using a signal of a second radio frequency band, the first semiconductor chip including:
  a first local oscillator for oscillating a first local signal;
  a first mixing unit for frequency-converting the signal of the first radio frequency band using the first local signal supplied from the first local oscillator; and
  a first-local-signal-output terminal for outputting the first local signal supplied from the first local oscillator to an outside of the first semiconductor chip,
the second semiconductor chip including:
  a second local oscillator for oscillating a second local signal;
  a first-local-signal-input terminal for inputting the first local signal supplied from the first-local-signal-output terminal to the into the second semiconductor chip; and
  a second mixing unit for frequency-converting the signal of the first radio frequency band using one of the second local signal supplied from the second local oscillator and the first local signal supplied from the first-local-signal-input terminal,
wherein, when frequency of the first local signal fed from the first-local-signal-output terminal to the first-local-signal-input terminal is in a predetermined range from the second frequency band, the second mixing unit frequency-converts the signal of the first radio frequency band using the second local signal supplied from the second local oscillator,
wherein, when frequency of the first local signal fed from the first-local-signal-output terminal to the first-local-signal-input terminal is out of the predetermined range from the second frequency band, the second mixing unit frequency-converts the signal of the first radio frequency band using the first local signal supplied from the first-local-signal-input terminal,
the first semiconductor chip further includes a first buffer for outputting the first local signal supplied from the first local oscillator to the first-local-signal-output terminal, and
the second semiconductor chip further includes a second buffer for inputting the first local signal supplied from the first-local-signal-input terminal into the second mixing unit,
the first semiconductor chip further includes a third buffer coupled to the first buffer in parallel, input/output of the third buffer being in a direction opposite to input/output of the first buffer, and
the second semiconductor chip further includes a fourth buffer coupled to the second buffer in parallel, input/output of the fourth buffer being in a direction opposite to input/output of the second buffer.

7. An electronic apparatus comprising:
  a first semiconductor chip and a second semiconductor chip for receiving a signal of a first radio frequency band;
  a demodulator coupled to an output side of the first semiconductor chip and the second semiconductor chip;
  a signal processing unit coupled to an output side of the demodulator;
  a display unit coupled to an output side of the signal processing unit; and
  a communication unit for performing communication using a signal of a second radio frequency band,
the first semiconductor chip including:
  a first local oscillator for oscillating a first local signal;
  a first mixing unit for frequency-converting the signal of the first radio frequency band using the first local signal supplied from the first local oscillator; and
  a first-local-signal-output terminal for outputting the first local signal supplied from the first local oscillator to the second semiconductor chip,
the second semiconductor chip including:
  a second local oscillator for oscillating a second local signal;
  a first-local-signal-input terminal for inputting the first local signal supplied from the first-local-signal-output terminal into the second semiconductor chip; and
  a second mixing unit for frequency-converting the signal of the first radio frequency band using one of the second local signal supplied from the second local oscillator and the first local signal supplied from the first-local-signal-input terminal,
wherein, when frequency of the first local signal is determined to be within a predetermined frequency range of the second frequency band, the first semiconductor chip does not output the first local signal to the second semiconductor chip, and the second mixing unit frequency-converts the signal of the first radio frequency band using the second local signal,
wherein, when frequency of the first local signal is determined to be out of the predetermined frequency range of the second frequency band, the first semiconductor chip outputs the first local signal to the second semiconductor chip, and the second mixing unit frequency-converts the signal of the first radio frequency band using the first local signal.

* * * * *